Jan. 4, 1966    F. E. LEIB ETAL    3,226,814
WIRE CLADDING SYSTEM
Filed Oct. 5, 1961
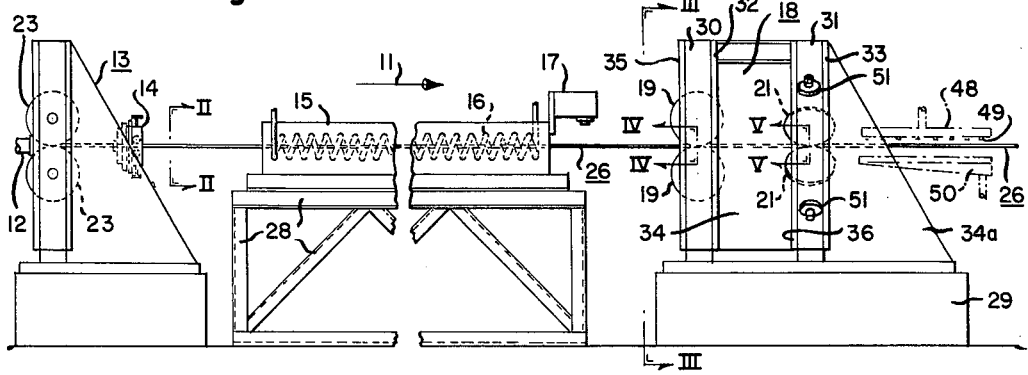
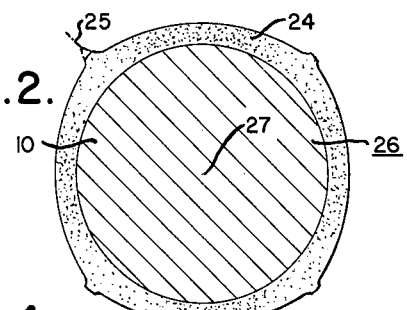
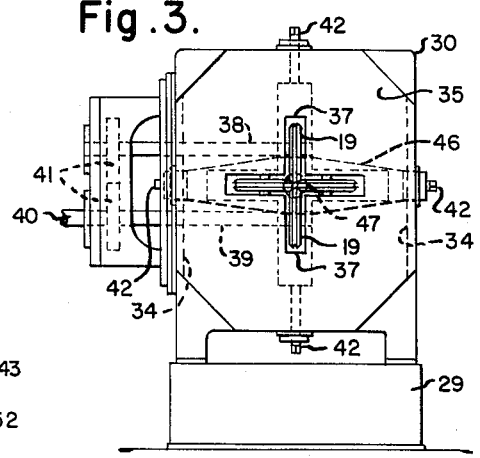
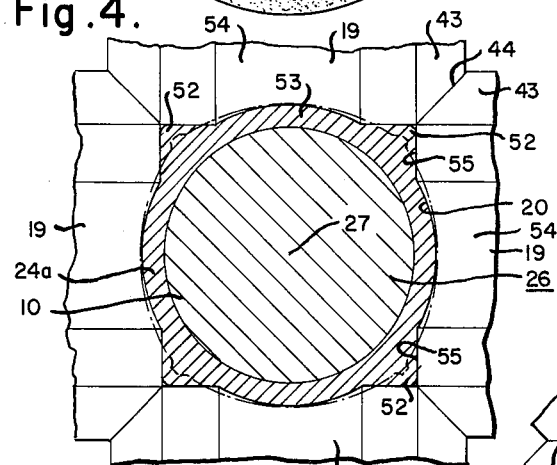
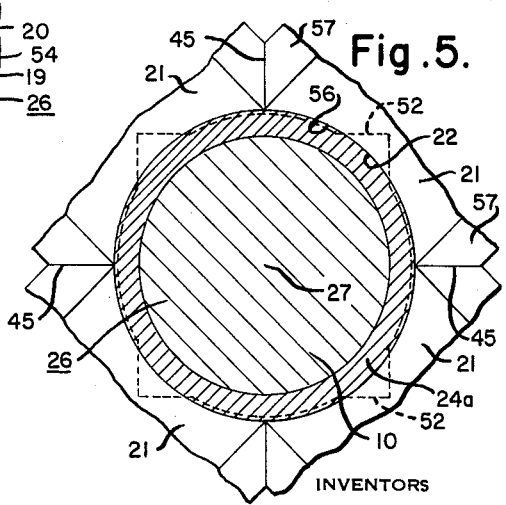
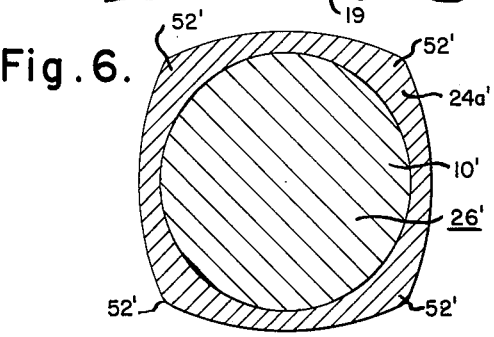
INVENTORS
Francis E. Leib, James H. Schmalz,
John G. Kura & James H. Peterson United States Patent Office 3,226,814
Patented Jan. 4, 1966

3,226,814
WIRE CLADDING SYSTEM
Francis E. Leib, Mount Lebanon, and James H. Schmalz, Dravosburg, Pa., and John G. Kura and James H. Peterson, Columbus, Ohio, assignors, by direct and mesne assignments, to Copperweld Steel Company, Pittsburgh, Pa., a corporation of Pennsylvania
Filed Oct. 5, 1961, Ser. No. 143,234
14 Claims. (Cl. 29—420.5)

This invention relates to a composite wire cladding system in which cladding initially in the form of metal powder is bonded to a wire core. More particularly, this invention relates to such cladding at substantially non-reduction pressures after heating which avoid any substantial production of solid metal fins which subsequently have to be removed. The invention is applicable to a wide variety of composite wires having metal cores and cladding metal materials, similar and dissimilar, including aluminum cladding of a steel core suitable for optional subsequent reduction in diameter by die drawing.

In producing "Alumoweld" aluminum-clad steel core composite wire heretofore, the rolling pass immediately following the heating of the compacted cladding material and core has been smaller in cross sectional area than that of the heated composite wire entering that pass, effecting a reduction of the composite cross section inclusive both of the cross section of the cladding material and of the core to an extent in some cases of about fifteen percent. Such reduction pressure rolling using a four-axis Turk's-head rolling mill, having rolls with peripheral grooves defining the reduction rolling pass and beveled mating edges, produced longitudinal substantially solid metal fins at cardinal points at quandrantal intervals around the circumference of the roll-reduced composite wire in the two crossing planes respectively defined by the diagonally opposite mating surfaces of the rolls and the axis of the pass line along which the composite wire moved. Such fins as a practical matter for the production of suitable commercial product and to be removed to avoid folds or laps in further processing and such was performed by a shaver of the type shown in United States patent application Serial No. 773,125 filed June 16, 1958, now Patent No. 3,088,195. Further drawbacks of such prior practice include the loss of metal in fins cut off by the shaver, possibility of damage to the thickness and continuity of the cladding metal, time and expense of maintenance in keeping the shaver continuously in operating shape, and limitation in the line speed imposed by the ability of the shaver to cut off such fins while the metal of the fins was hot from the previous heating operation. Other difficulties also attended such prior practice in that the roll reduction after heating introduced another variable related to the size and type of core steels used in making commercial products and increased the problem of keeping the rolling pass true because of the reduction pressure and wear involved.

In the improved practice of the wire cladding system disclosed herein, the foregoing problems and difficulties have been overcome and in the following disclosure herein the term "wire" is used as inclusive of those larger sizes sometimes called "rod," particularly inasmuch as the invention is not limited to matters of size or dimension. In the instant system of this invention, the composite wire comprising a core and a cladding of selected thickness compacted thereon as in the prior practice to a density approaching, say, ninety-six to ninety-eight percent of that of solid metal, is heated also as in the prior practice, but then passes through a closed work-shaping rolling pass which has virtually the same cross sectional area as the cross sectional area of the heated wire entering the pass with, however, the pass profile shape tending to be star-shaped, or somewhat squarish, and different from the cross sectional shape of the entering wire in order to work the cladding upon the core to promote coherency in the cladding material and bonding between the cladding material and the core; the pass profile in such non-reduction shaped rolling pass being precisely sized further to inhibit either underfill or overfill with the corners of the shaped pass preferably being at cardinal points around the axis of the wire pass line when a four-axis Turk's-head rolling mill is used. Further, under this invention, a rounding rolling pass preferably is used for the wire immediately following in time and distance the non-reduction rolling pass and having a cross sectional area again virtually the same as the cross sectional area of the entering wire with the aforesaid somewhat star-shaped or squarish outline in cross section; the different shape of the rounding pass operating to push down the corners or blunt points of and round the cladding material from the work-shaping pass and so that the cladding material leaving the rounding pass is concentric, preferably, around the core as desired by most commercial standards. Preferably, a four-axis mill is also used for such rounding pass with the cross sectional area of the pass being precisely sized to provide a slight underfill relative to the cross sectional area of the composite wire entering the rounding pass, and, with the mid-point of the grooves defining the rounding pass opposite to the corners respectively of the cladding of the wire entering the rounding pass. Such non-reduction rolling will produce clad wire product having cladding which is continuous coherent metal bonded to the core and suitable, when such is desired, for reduction to smaller size by die drawing which will proportionately reduce the cross section of both cladding and core in the finish product of this invention.

Other objects, features and advantages of this invention will be apparent from the following description and the accompanying drawings, which are schematic only, in which FIGURE 1 is an illustrative view of a portion of a horizontal pass line for the making of clad wire product in accordance with one embodiment of this invention;

FIGURE 2 is a cross section taken along line II—II of FIGURE 1 of the composite wire moving along the pass line with the cladding material in compacted form on the core thereof;

FIGURE 3 is a front view taken along the line III—III of FIGURE 1 of the four-axis mill with immediately succeeding work-shaping and rounding passes used in the embodiment of FIGURE 1;

FIGURE 4 is a partial view in cross section taken generally along line IV—IV of FIGURE 1 and illustrating a work-shaping pass operation performed upon the cladding material of the wire of FIGURE 2 following its passage through the heating zone;

FIGURE 5 is a partial view in cross section taken generally along line V—V showing the rounding pass operation performed upon the cladding material of the wire of FIGURE 4 following its exit from the work-shaping pass of FIGURE 4 in the illustrated embodiment; and FIGURE 6 is a somewhat modified wire cross section which is more squarish in shape, which is usable in lieu of the somewhat star-shaped profile shown in FIGURE 4 by making a change in the work-shaping pass profile of the work-shaping rolls used at the front of the mill shown in FIGURE 3.

Referring to the drawings therein, an elongated solid metal wire core 10 is pulled along a horizontal pass line in the direction of arrow 11 through equipment inclusive of items shown comprising a powder cladding metal applicator member 12, a roll compacting mill 13, a shaver device 14, a heating zone 15 having an electric induction heating coil 16 and an energy ray control 17 and a finishing mill 18 having work-shaping rolls 19 for the cladding metal defining a closed work-shaping pass 20 and rounding rolls 21 defining a closed rounding pass 22, respectively. The applicator 12 with compacting rolls 23 applies powdered cladding metal as a compacted cladding 24 to core 10, generally in accordance with the disclosure in United States patent application Serial No. 820,044, filed June 12, 1959, now Patent No. 3,048,892. The density of the pressed powdered cladding material 24 preferably approaches that of solid metal after roll compacting by rolls 23, e.g., in the case of aluminum, with a density in the more dense portions approaching 98% of that of solid aluminum. The pressure exerted by rolls 23 causes the formation of longitudinally extending fins, one of which is illustrated at 25 in the upper left-hand corner of FIGURE 2 in dotted lines, at each of the cardinal points around the periphery of the wire 26 comprising core 10 and cladding 24, such cardinal points being in the cross planes passing through pass line axis 27 tangent to adjoining mating surfaces of the rolls 23 where the fins 25 are formed. The axis 27 of the pass line is coincident with the axis of wire 26. Since fins 25 are of compressed powder material, they are readily removed by a shaver device 14, disclosed in United States patent application Serial No. 818,715, filed June 8, 1959, now Patent 3,115,703, without disturbing the body of the powder cladding material 24. After such definning, wire 26 appears in cross-section substantially as represented by the full lines in FIGURE 2.

As wire 26 passes through induction heating coil 16, it is heated at least to the interface between the core and cladding to a temperature in the neighborhood of but below the melting temperature of the metal, either in the cladding or core, having the lower melting point, if such materials are dissimilar in composition and/or kind. Generally, the cladding metal will be more electrically conductive, or more corrosion resistant, or both, and have a lower melting point than the core metal where the two metals are quite different. In the case of aluminum-clad steel core wire, the cladding material preferably is raised to a temperature, for example, of about 1100° F. Heating device 15 includes a support 28 therefor within which a hollow water-cooled electrical induction coil 16 is positioned. The temperature induced by the electromagnetic energy supplied by the induction coil 16 is regulated by a control device 17 which has a selective energy-responsive cell facing the wire 26 as it issues from heater 15, control 17 being sensitive to infrared rays, as disclosed in United States patent application Serial No. 815,622, filed May 25, 1959, now Patent No. 3,035,143, to provide and maintain the temperature induced into wire 26 at a predetermined level.

Mill 18 is provided with a base 29 having roll support frames 30 and 31 mounted thereon in axial adjacency and respectively secured to plates 32 and 33. Plates 32 and 33 are rigidly connected top and bottom to each other by side plates 34 fixed to base 29 to provide a completely rigid mounting structure. Each frame 30 and 31 is provided with a front plate respectively numbered 35 and 36. As shown in FIGURE 3, frame 30 has its four rolls 19 mounted in upright cross form, each roll having a segment projecting forwardly through a slot 37 in plate 35 and rearwardly through a similar slot in plate 32. The vertical upper and lower rolls 19 have axles 38 and 39 respectively which are driven by a motor (not shown) connected to a shaft 40 with meshing gears 41 on the respective axles. The driven rolls rotate in a direction to feed wire 26 as shown by arrow 11 to pass through closed pass 20 defined by all of the work-shaping rolls 19. The horizontal rolls 19 are not driven in the illustrated embodiment.

Each of the rolls 19 is provided with a screwdown 42 utilized in start-up and in providing a predetermined preloading pressure upon beveled mating surfaces 43 adjoining ones of which engage along lines 44 to close roll pass 20 in the plane of the axes of the rolls 19, which plane corresponds to the plane of the drawing comprising FIGURE 4. Features of construction of such a mill are illustrated more fully in the aforesaid patent application Serial No. 773,125. Planes through the lines 44 and axis 27 cross in the form of an "X" and define cardinal points 90° apart around the periphery of wire 26.

Although FIGURE 4 illustrates the definned periphery of wire 26 as it leaves shaver 14 superimposed in chain line outline on FIGURE 4 to indicate contour change for working of the cladding metal in passing through the work-shaping pass 20, it will be recognized that wire 26 may be expected to twist in the course of its passage between mill 13 and mill 18 so that the definned locations 90° apart around the periphery of wire 26 entering pass 20 more than likely will not coincide in direction (as shown) with the engagement lines 44, but irrespective of whether or not there is such directional coincidence, work-shaping pass 20 will work the heated cladding material entering that pass 20 regardless of its orientation around the axis of pass line 27. The cladding material 24a in wire 26 leaving work-shaping pass 20 no longer is compacted powder but, instead, a continuous and coherent cladding of solid metal.

Frame 31 is constructed like frame 30 and has four rolls 21 mounted therein, except that frame 31 is rotated about axis 27 an angular distance of 45° so that its cardinal points along the lines 45 of the mating surface engagements among rolls 21 are respectively vertical and horizontal as illustrated in FIGURE 5. If desired, a rigidifying cross brace 46 may be connected to opposite sides 34 in the space between the frames 30 and 31 and provided with an opening 47 centrally therethrough for the passage of wire 26 along its pass line. If desired further, an auxiliary supplemental induction heater may be mounted on cross brace 46 around opening 47 to offset any heat loss in wire 26 from the time it left heating zone 15. A cooling device 48 to spray coolant, such as water, through the nozzles 49 upon wire 26 preferably is provided and supported between the rear portions 34a of plates 34 so that there will be some surface cooling of wire 26 as it leaves pass 22, the draining coolant being conducted away by a trough 50.

Rolls 21 of frame 31 preferably are as close as possible to rolls 19 to minimize twisting of wire 26 induced by core 10 and are moved into mating engagement along lines 45 by a predetermined preloading pressure exerted through screwdowns 51 to define a closed rounding pass 22 as illustrated in FIGURE 5. When wire 26 leaves rounding pass 22, the core 10 is substantially unreduced in diameter and cladding 24a is concentric around core 10 and metallurgically bonded thereto at the interface therebetween sufficiently to satisfactorily undergo die drawing.

The development of the bond appears to stem, without this invention being limited to such theory, from the rupture of the oxide surface film in the case of aluminum powder particles used as a cladding material and the hot working of the cladding material against the core "anvil" in mill 18. Work-shaping pass 20 has a profile contour as shown in FIGURE 4 which bounds an area virtually the same as the cross-sectional area of the wire 26 shown n FIGURE 2. However, pass 20 has a different contour relative to the peripheral outline of wire 26 in FIGURE 2 with compacted cladding powder metal 24 thereon, the latter outline being shown in chain line in FIGURE 4 for comparison purposes. Pass 20 is somewhat star-shaped with blunt points 52 at its cardinal points 90° apart and the movement of heated cladding metal into those blunt point areas from the transverse arcuate portions 53 between those points hot works the cladding metal so as to form a coherent and continuous metal cladding 24a surrounding core 10 and bonded thereto. The blunt points 52 exiting from pass 20 appear on the wire 26 in the form of longitudinally extending continuous ribs which are squashed back into substantially true arcuate form with additional working of the cladding metal when passing through rounding pass 22 without folding over, or forming fins in the planes of engagement lines 45, particularly in view of the non-reducing pressure character of the work-shaping and rounding passes 20 and 22.

The profile of pass 20 is provided by the contour of the transverse periphery of each roll 19, each such roll having a central groove 54 transversely concave toward axis 27 and ending in a flat 55 to each side of groove 54 to form one side of a blunt portion 52. The symmetry of the contouring of one roll 19 is maintained in each of the others for convenience, but the principle of this invention would be applicable if the transverse contour of the successive roll peripheries were somewhat asymmetrical, e.g., in the blunt point areas. The cross sectional area of pass 20 is made just about the same as the cross sectional area of wire 26 as it leaves shaver device 14 to insure working of the cladding metal and filling of the blunt point areas 52 defined by flats 55 in pass 20. Such correspondence between the internal area of pass 20 and the cross-sectional area of wire 26 just before it enters pass 20 means that pass 20 will be assured of substantially complete filling without any substantial or material "overfill" which moreover would only tend to form a very light whisker along a cardinal point as distinguished from the relatively heavy fins produced under prior smaller rolling pass practice. Thus, material advantages are obtained under this system using a substantially non-reduction rolling pass which, moreover, reshapes and works the cladding material 24a on the surface of core 10 for achievement and promotion of bond between the two materials and of solid metal structure in the metal cladding.

To provide a modification as shown in FIGURE 6, the contour of rolls 19 defining pass 20 would be correspondingly changed and provided with a somewhat more squarish profile so that hot working and shaping of heated cladding material against core 10′ would be obtained as wire 26′ enters such revised pass profile to produce work shaped continuous coherent cladding material 24a′ with blunt corners 52′ at cardinal points 90° apart around the periphery of wire 26′, which then would be subjected to round pass rolling such as that provided for by pass 22.

In rounding pass 22 shown in the illustrated embodiment, the blunt points 52 of the cladding material 24a are squashed and further work achieved on the cladding metal against the core of the wire promoting the bonding at the interface and, in the illustrated situation, producing a uniform thickness of cladding for commercial electrical or mechanical purposes. The contour of rounding pass 22 is achieved by providing transversely arcuate grooves 56 in the rolls 21 concave toward axis 27, the mating surfaces 57 of which rolls engage on lines 45 in the plane of the pass defined by the axes of the four shafts on which the rolls 21 rotate, preferably with none of such rolls being driven. The cross-sectional area of closed pass 22 is virtually the same as the cross-sectional area of the wire entering such pass. The precision with which the rolls 21 are made preferably allows for a barely underfilled relation in that the cross-sectional area of pass 22 preferably is but very minutely larger than the cross-sectional area of the wire entering that pass, such minute extra space preferably being arranged around the periphery toward the mating lines 45 to insure complete squashing of the blunt corners 52 (or corners 52′, as the case may be) and the rounding of the cladding 24a to a uniform thickness around core 10 in the wire 26 issuing from pass 22. As described above, the bond in the clad wire issuing from work-shaping and rounding passes of this invention is suitable for use of such wire in the finished size provided by such rounding pass, or for direct die drawing, as desired. And in some cases the clad wire issuing from the work-shaping pass 20 with its blunt points or corners may be die drawn directly upon such wire leaving the work-shaping pass, as where the cladding material and core are sufficiently ductile. Further, the amount of cladding material in the finished product made by the system of this invention is greater because of the reduction in loss of cladding material relative to prior practice. Still further, this invention is applicable to a larger range of starting metals and/or the cladding of smaller size wires as a practical matter than deemed practical under prior practice. And under this invention, a cladding of substantial selected thickness can be applied to an elongated preformed core without using any flux or bonding agent, without forming and brittle or inflexible compound even in the case of aluminum cladding of steel or other ferrous metal core, without detrimental diffusion of one metal into the other at the interface, without obtaining a cladding which contains voids, cracks or interruptions detrimental to electrical conductivity and/or corrosion resistance protection, and with increased production speeds of finished wire which moreover are suitable for die drawing to smaller final size, when desired.

As an example of one operation of this invention, a die-drawn steel core (of, say, composition C–1045 steel) having an approximate diameter of three-eighths of an inch, would be fed from a coil and chilled iron grit-blasted metallurgically clean before being pulled through the equipment schematically illustrated in FIGURE 1. Therein, applicator 12 applies the cladding aluminum powder to the outside of the core and compacting mill 13 presses that cladding directly against the core to a "green" cladding density in the neighborhood of 98% of the theoretical density of solid aluminum metal, the thickness of the cladding so applied corresponding, say, to 10% of the weight of the composite wire to provide, in such case, a finished wire having a nominal diameter of 0.450 inch, corresponding to and having electrical conductivity corresponding to 30+% of a solid aluminum wire of the same outside diameter. In heater 15, a temperature would be induced into the composite wire to bring the cladding to about 1100° F. and during the work-shaping of the aluminum cladding in rolls 19 and the rounding thereof by rolls 21, the union of the cladding material into a continuous coherent cladding metal and the bonding thereof to the steel core is achieved without any substantial reduction of the cross sectional area of the core. The finished composite wire so produced may then be die drawn to desired final wire size in successive steps.

Although in the illustrative embodiment shown in the drawings and described above, a four axis mill with four rolls in each frame, is utilized, it will be recognized that other roll mechanism may be provided having the work-shaping roll pass object of this invention; that more or fewer rolling passes may be utilized than those illustrated in FIGURE 1 of the drawings; that other compacting and/or heating mechanisms may be employed; that various changes may be made in the illustrated embodiment and other embodiments provided; and that various metal cladding and core materials may be used; all without departure from the spirit of this invention or the scope of the appended claims.

We claim:

1. In a method of producing a clad wire, the steps comprising roll compacting cladding metal in powdered form completely around and directly against an elongated solid wire core being pulled along a pass line to a density in said compacted cladding metal approaching that of solid metal, heating said wire to raise at least the interface between said cladding metal and core by electromagnetic induction to a temperature in the neighborhood of but below the melting point of said cladding metal, work rolling said heated wire in a closed work-shaping roll pass having an outwardly cornered profile at angularly spaced positions to hot work said cladding metal by reshaping it against said core into said cornered profile utilizing transverse movement of said cladding metal, the area of said work-shaping pass being just filled by said heated wire, and immediately round rolling said work rolled wire in a closed rounding roll pass having a circular profile to provide said circular profile with substantial concentricity between said cladding metal and said core, the area of said rounding pass being barely filled by said work rolled wire, whereby cladding metal initially in powdered form becomes a continuous coherent cladding bonded to said core in the finished wire product leaving said rounding pass.

2. In a method of producing a clad wire, the steps comprising roll compacting cladding metal in powdered form directly against an elongated solid wire core moving along a pass line to a destiny in said compacted cladding metal approaching that of solid metal, heating said wire to a temperature at least at the interface between said cladding metal and core in the neighborhood of but below the melting point of said cladding metal, work rolling said heated wire in a closed work-shaping roll pass to hot work said cladding metal by reshaping it utilizing transverse movement against said core into a substantially cornered periphery as viewed in cross section, the area of said work-shaping pass being substantially the same as that of said heated wire entering said work-shaping roll pass, and immediately round rolling said work rolled wire in a closed rounding roll pass to provide substantial concentricity between said cladding metal and said core, the area of said rounding pass being substantially the same as that of said work rolled wire, whereby cladding metal initially in powdered form becomes a continuous coherent cladding bonded to said core in the finished wire product leaving said rounding pass.

3. In a method of producing an aluminum-clad steel core wire or the like, the steps comprising those set forth in claim 2, in which said cladding metal is aluminous metal and said core is steel and said temperature is in the neighborhood of 1100° F. but below the melting point of said aluminous metal.

4. In a method of producing a copper-clad steel core wire or the like, the steps comprising those set forth in claim 2, in which said cladding metal is cupreous metal and said core is steel and said temperature is in the neighborhood of 1800° F. but below the melting point of said cupreous metal.

5. In a method of producing a clad wire, the steps comprising roll compacting cladding metal in powdered form directly against an elongated solid wire core moving along a pass line to a relatively high density, heating said cladding metal at least to the interface between said cladding metal and core to a temperature in the neighborhood of but below the melting point of said cladding metal, and work rolling said heated wire in a closed work-shaping roll pass to hot work said cladding metal by reshaping it utilizing transverse movement against said core into a substantially cornered periphery as viewed in cross section, the area of said work-shaping pass being substantially the same as that of said heated wire entering said work-shaping roll pass, whereby cladding metal initially in powdered form becomes a continuous coherent cladding bonded to said core in the wire product leaving said work-shaping pass.

6. In a method of producing a clad wire, the steps comprising, compacting onto a core a powdered metal cladding in generally concentric relation to said core, heating said wire having said core with compacted powder metal cladding thereon to a temperature in the neighborhood of but below the melting point of the lower melting of the cladding and core metals respectively, pulling said heated wire through a closed work-shaping roll pass, transversely reshaping the cross sectional design of said cladding during passage through said work-shaping pass to work said cladding against said core without significant reduction in cross sectional area or change in the design of the cross section of said core.

7. In a method of producing a clad wire, the steps comprising, heating a wire having a core with compacted powder metal cladding thereon in generally concentric relation to said core to a temperature in the neighborhood of but below the melting point of the lower melting of the cladding and core metals respectively, pulling said heated wire through a closed work-shaping roll pass, transversely reshaping the cross sectional design of said cladding during passage through said work-shaping pass to work said cladding against said core without significant reduction in cross sectional area or change in the design of the cross section of said core, pulling said wire leaving said work-shaping pass through a closed further roll pass substantially immediately upon its leaving said work-shaping pass and further reshaping the reshaped cross sectional design of said cladding during passage through said further pass against said core without any significant reduction or change in the design of the cross section of said core.

8. Apparatus for providing clad wire from compacted powder metal cladding on a preformed wire core in the course of movement along a pass line, comprising means for compacting onto a core a powdered metal cladding in generally concentric relation to said core, means for heating said wire to a temperature in the neighborhood of but below the melting point of the lower melting of said cladding and core metals, a plurality of rolls having beveled edges in mating roll engagement to define a plane containing a closed work-shaping pass through said rolls, each roll having a peripheral transversely arcuate groove concave toward the axis of said pass line with adjoining margins of adjoining grooves extending laterally outwardly to define a corner of said work-shaping pass radially inwardly of said mating roll engagement adjacent that corner, the arcuate groove between corners being closer to said core than the periphery of the cladding on the core of the heated wire entering said pass to engage said arcuate portions of said groove whereby cladding metal is displaced transversely into said corners to just fill the same during the movement of said heated wire through said pass, the area of said pass being substantially the area of the heated wire entering said pass so that said heated wire will just fill said pass when said cladding metal is so displaced by said rolls.

9. Apparatus for providing clad wire from compacted powder metal cladding on a preformed wire core in the course of movement along a pass line, comprising means for heating said wire to a temperature in the neighborhood of but below the melting point of the lower melting of said cladding and core metals, a plurality of rolls having beveled edges in mating roll engagement to define a plane containing a closed work-shaping pass through said rolls, said plurality of rolls being four Turks'-head rolls, means for driving at least one pair of said rolls lying in opposed relation in the same plane to rotate at said pass in the direction of said movement along said pass line, each roll having a peripheral transversely arcuate groove concave toward the axis of said pass line with adjoining margins of adjoining grooves extending laterally outwardly to define a corner of said work-shaping pass radially inwardly of said mating roll engagement adjacent that corner, the arcuate groove between corners being closer to said core than the periphery of the cladding on the core of the heated wire entering said pass to engage said arcuate portions of said groove whereby cladding metal is displaced transversely into said corners to just fill the same during the movement of said heated wire through said pass, the area of said pass being substantially the area of the heated wire entering said pass so that said heated wire will just fill said pass when said cladding metal is so displaced by said rolls.

10. Apparatus for providing clad wire from compacted powder metal cladding on a preformed wire core in the course of movement along a pass line, comprising means for heating said wire to a temperature in the neighborhood of but below the melting point of the lower melting of said cladding and core metals, a plurality of rolls having beveled edges in mating roll engagement to define a plane containing a closed work-shaping pass through said rolls, each roll having a peripheral transversely arcuate groove concave toward the axis of said pass line with adjoining margins of adjoining grooves extending laterally outwardly to define a corner of said work-shaping pass radially inwardly of said mating roll engagement adjacent that corner, the arcuate groove between corners being closer to said core than the periphery of the cladding on the core of the heated wire entering said pass to engage said arcuate portions of said groove whereby cladding metal is displaced transversely into said corners to just fill the same during the movement of said heated wire through said pass, the area of said pass being substantially the area of the heated wire entering said pass so that said heated wire will just fill said pass when said cladding metal is so displaced by said rolls, a further plurality of such rolls each having a transversely arcuate groove concave toward the axis of said pass line, said grooves together defining a completely closed continuous curve pass at the respective position of each thereof nearest to said pass line, the area of said closed continuous curve pass being substantially the area of the wire entering said pass from said work-shaping pass so that said wire will barely fill said pass when said cladding metal is displaced by said further plurality of rolls, said further plurality of rolls being positioned adjacent and following said first-named plurality of rolls.

11. Wire cladding apparatus comprising in combination means for compacting powder metal to form a cladding around a preformed wire core moving along a pass line, means for heating said wire to a bonding temperature at the interface between cladding and core without melting any thereof, closed pass means for rolling the cladding on said heated wire into a different configuration by transverse redistribution thereof substantially without reduction in said core or the cross sectional area of said wire and further means for immediately again rolling the cladding on said wire into a configuration different from said different configuration by transverse redistribution thereof substantially without reduction in said core or the cross sectional area of said wire.

12. Apparatus for producing clad wire from compacted powder metal cladding on a preformed metal core in the course of movement along a pass line, comprising means for compacting onto a core a powdered metal cladding in generally concentric relation to said core, means for heating said wire to a temperature in the neighborhood of but below the melting point of said cladding, a plurality of rolls with adjoining ones in engagement along a mating lines of engagement, said rolls defining a closed work-shaping pass and each having a rolling surface symmetrical to each side of a plane through the axis of such pass line, said rolls having their respective axes at right angles to said first-named axis, said closed pass having a profile with blunt low-relief rib-forming indentations defined by adjoining margins of the rolling surface of respective adjoining rolls, said indentations being bisected by the mating line of engagement adjacent thereto and extending radially outwardly therefrom, the area of said closed pass being substantially the area of the heated wire entering said closed pass but of a different shape to displace cladding metal transversely into said indentations to form relatively low relief ribs in said cladding between said rolls and said core in the zone of said closed pass substantially without reduction of said core to provide a continuous coherent substantially solid metal cladding bonded to said core.

13. Apparatus for producing clad wire from compacted powder metal cladding on a preformed metal core in the course of movement along a pass line, comprising means for heating said wire to a temperature in the neighborhood of but below the melting point of said cladding, a plurality of rolls with adjoining ones in engagement along a mating line of engagement, said rolls defining a closed work-shaping pass and each having a rolling surface symmetrical to each side of a plane through the axis of such pass line, said rolls having their respective axes at right angles to said first-named axis, said closed pass having a profile with blunt low-relief rib-forming indentations defined by adjoining margins of the rolling surface of respective adjoining rolls, said indentations being bisected by the mating line of engagement adjacent thereto and extending radially outwardly therefrom, the area of said closed pass being substantially the area of the heated wire entering said closed pass but of a different shape to displace cladding metal transversely into said indentations to form relatively low relief ribs in said cladding between said rolls and said core in the zone of said closed pass substantially without reduction of said core to provide a continuous coherent substantially solid metal cladding bonded to said core, a further plurality of rolls in mating engagement defining a closed rounding pass, each of said last-mentioned rolls having a peripheral groove in the form of a circular arc concave toward said axis and symmetrical to each side of a plane through said axis, said last-mentioned rolls having their respective axes at right angles to said first-named axis, the area of said further closed pass being substantially the same area as that of the wire entering said rounding pass and having a circular profile to rearrange cladding metal around said core to put it into concentric relation to said core substantially without any reduction of said core.

14. Apparatus for providing clad wire from compacted powdered metal cladding on a preformed metal core in the course of movement thereof along a pass line, comprising means for compacting onto a core a powdered metal cladding in generally concentric relation to said core, means for heating said wire to a temperature in the neighborhood of but below the melting point of the lower melting of said cladding and core metals, closed pass rolling means having a differently shaped pass profile for said wire for redistributing said cladding on said core in said heated wire transversely of the surface of said core substantially without any reduction change of shape of the area of said cladding metal and said core and without baring any part of said core, said redistribution being sufficient to promote a continuous coherent substantially solid metal cladding bonded to said core.

References Cited by the Examiner

UNITED STATES PATENTS

| | | | |
|---|---|---|---|
| 410,202 | 9/1889 | Sandford | 80—59 |
| 411,480 | 9/1889 | Warren | 29—35 |
| 721,209 | 2/1903 | Mannesmann | 80—11.3 |
| 1,883,205 | 10/1932 | Whitehead | 29—547 |
| 2,071,712 | 2/1937 | Stuting | 80—34 |
| 2,234,127 | 3/1941 | Mautsch | 29—420 |
| 2,268,472 | 12/1941 | Bungeroth | 29—35 |
| 2,756,492 | 7/1956 | Pettibone | 29—420.5 |
| 2,873,517 | 2/1959 | Wellman | 29—420.5 |
| 2,917,821 | 12/1950 | Fritsch | 29—420.5 |

WHITMORE A. WILTZ, *Primary Examiner.*

HYLAND BIZOT, *Examiner.*

UNITED STATES PATENT OFFICE
CERTIFICATE OF CORRECTION

Patent No. 3,226,814　　　　　　　　　　　　　　　January 4, 1966

Francis E. Leib et al.

It is hereby certified that error appears in the above numbered patent requiring correction and that the said Letters Patent should read as corrected below.

Column 1, line 40, for "and" read -- had --; column 6, line 13, for "and" read -- any --; column 7, line 71, for "againt" read -- against --; column 9, line 50, for "lines" read -- line --; column 10, line 46, strike out "any"; line 64, for "12/1950" read -- 12/1959 --.

Signed and sealed this 10th day of January 1967.

(SEAL)
Attest:

ERNEST W. SWIDER　　　　　　　　　　　　　　　EDWARD J. BRENNER
Attesting Officer　　　　　　　　　　　　　　　　Commissioner of Patents

UNITED STATES PATENT OFFICE
CERTIFICATE OF CORRECTION

Patent No. 3,226,814                                January 4, 1966

Francis E. Leib et al.

It is hereby certified that error appears in the above numbered patent requiring correction and that the said Letters Patent should read as corrected below.

Column 1, line 40, for "and" read -- had --; column 6, line 13, for "and" read -- any --; column 7, line 71, for "againt" read -- against --; column 9, line 50, for "lines" read -- line --; column 10, line 46, strike out "any"; line 64, for "12/1950" read -- 12/1959 --.

Signed and sealed this 10th day of January 1967.

(SEAL)
Attest:

ERNEST W. SWIDER                                    EDWARD J. BRENNER
Attesting Officer                                       Commissioner of Patents